(12) United States Patent
Theberge

(10) Patent No.: US 8,763,052 B2
(45) Date of Patent: Jun. 24, 2014

(54) SYSTEM FOR ENABLING VIDEO-BASED INTERACTIVE APPLICATIONS

(75) Inventor: James P. Theberge, Livermore, CA (US)

(73) Assignee: EAT.TV, INC., San Rafael, CA (US)

( * ) Notice: Subject to any disclaimer, the term of this patent is extended or adjusted under 35 U.S.C. 154(b) by 1311 days.

(21) Appl. No.: 11/260,901

(22) Filed: Oct. 28, 2005

(65) Prior Publication Data

US 2006/0174289 A1     Aug. 3, 2006

Related U.S. Application Data

(60) Provisional application No. 60/623,369, filed on Oct. 29, 2004.

(51) Int. Cl.
*H04N 7/173*     (2011.01)

(52) U.S. Cl.
USPC .................. 725/87; 725/37; 725/45; 725/91; 709/231

(58) Field of Classification Search
CPC ..... H04N 21/00; H04N 21/20; H04N 21/222; H04N 21/234; H04N 21/2365
USPC ............................... 725/86–104, 37; 709/231
See application file for complete search history.

(56) References Cited

U.S. PATENT DOCUMENTS

| | | | |
|---|---|---|---|
| 4,712,191 A | 12/1987 | Penna | 364/900 |
| 4,751,578 A | 6/1988 | Reiter et al. | 358/183 |
| 4,914,516 A | 4/1990 | Duffield | 358/183 |
| 5,038,211 A | 8/1991 | Hallenbeck | 358/142 |
| 5,142,662 A | 8/1992 | Gump et al. | 395/100 |
| 5,161,012 A | 11/1992 | Choi | 358/183 |
| 5,181,273 A | 1/1993 | Ohtani | 395/161 |
| 5,194,954 A | 3/1993 | Duffield | 358/193.1 |
| 5,198,802 A | 3/1993 | Bertram et al. | 340/709 |

(Continued)

FOREIGN PATENT DOCUMENTS

| | | |
|---|---|---|
| EP | 0676705 | 10/1995 |
| EP | 0883055 | 9/1998 |
| EP | 1052849 A1 * | 11/2000 |
| EP | 1246465 | 10/2002 |

OTHER PUBLICATIONS

United States Patent and Trademark Office, Office Action, Mailed Mar. 16, 2010, U.S. Appl. No. 10/856,200, filed May 28, 2004, First Named Inventor: Duane M. Reid, pp. 31.

(Continued)

*Primary Examiner* — Benjamin R Bruckart
*Assistant Examiner* — Anthony Bantamoi
(74) *Attorney, Agent, or Firm* — Haverstock & Owens LLP

(57) ABSTRACT

A system and method for delivering interactive program guides includes encoding a plurality of different user interface screens of an interactive application into a series of short video segments. The video segments have associated metadata files that uniquely describe each segment, wherein the segment metadata enables the ingestion of the video segments via an asset distribution and management system into a video-on-demand server and facilitates their subsequent identification by the video-on-demand server. As viewers interact with the application, their input device key presses are processed and delivered to a mapping server that utilizes the data in a configuration file to instruct the video-on-demand server to splice the appropriate interactive application user interface digital video segment into the video stream being displayed on the display device.

18 Claims, 3 Drawing Sheets

(56) References Cited

U.S. PATENT DOCUMENTS

| | | | |
|---|---|---|---|
| 5,235,509 A | 8/1993 | Mueller et al. | 364/405 |
| 5,293,357 A | 3/1994 | Hallenbeck | 348/734 |
| 5,297,253 A | 3/1994 | Meisel | 395/160 |
| 5,353,401 A | 10/1994 | Iizawa et al. | 395/161 |
| 5,398,074 A | 3/1995 | Duffield et al. | 348/564 |
| 5,421,012 A | 5/1995 | Khoyi et al. | 395/650 |
| 5,574,843 A | 11/1996 | Gerlach, Jr. | |
| 5,602,596 A | 2/1997 | Claussen et al. | 348/564 |
| 5,731,844 A | 3/1998 | Rauch et al. | 348/563 |
| 5,734,720 A | 3/1998 | Salganicoff | 380/20 |
| 5,822,014 A * | 10/1998 | Steyer et al. | 725/41 |
| 5,926,230 A * | 7/1999 | Niijima et al. | 725/56 |
| 6,011,537 A | 1/2000 | Slotznick | |
| 6,021,433 A | 2/2000 | Payne et al. | 709/219 |
| 6,151,059 A | 11/2000 | Schein et al. | 725/37 |
| 6,253,375 B1 * | 6/2001 | Gordon et al. | 725/88 |
| 6,288,708 B1 | 9/2001 | Stringer | 345/169 |
| 6,295,055 B1 | 9/2001 | Miller et al. | 345/326 |
| 6,342,901 B1 | 1/2002 | Adler et al. | 345/700 |
| 6,353,448 B1 | 3/2002 | Scarborough et al. | 345/744 |
| 6,448,987 B1 | 9/2002 | Easty et al. | 345/834 |
| 6,469,719 B1 | 10/2002 | Kino et al. | 345/810 |
| 6,484,189 B1 | 11/2002 | Gerlach, Jr. et al. | 707/500.1 |
| 6,493,006 B1 | 12/2002 | Gourdol et al. | 345/825 |
| 6,507,352 B1 | 1/2003 | Cohen et al. | 345/817 |
| 6,549,219 B2 | 4/2003 | Selker | 345/834 |
| 6,600,503 B2 | 7/2003 | Stautner et al. | 345/854 |
| 6,608,633 B1 | 8/2003 | Sciammarella et al. | 345/700 |
| 6,731,316 B2 | 5/2004 | Herigstad et al. | 345/864 |
| 6,760,917 B2 * | 7/2004 | De Vos et al. | 725/94 |
| 7,174,512 B2 * | 2/2007 | Martin et al. | 715/719 |
| 2001/0010095 A1 | 7/2001 | Ellis et al. | 725/44 |
| 2001/0045965 A1 | 11/2001 | Orbanes et al. | 345/841 |
| 2001/0047302 A1 | 11/2001 | Yoshinaga et al. | 705/15 |
| 2001/0054183 A1 | 12/2001 | Curreri | 725/56 |
| 2002/0016961 A1* | 2/2002 | Goode | 725/9 |
| 2002/0030843 A1 | 3/2002 | Tuli | 358/1.15 |
| 2002/0038456 A1 | 3/2002 | Hansen et al. | |
| 2002/0059604 A1 | 5/2002 | Papagan et al. | 725/51 |
| 2002/0067376 A1 | 6/2002 | Martin et al. | 345/810 |
| 2002/0078449 A1 * | 6/2002 | Gordon et al. | 725/41 |
| 2002/0080188 A1 | 6/2002 | Somashekaraiah | 345/810 |
| 2002/0097261 A1 | 7/2002 | Gottfurcht et al. | |
| 2002/0100054 A1 * | 7/2002 | Feinberg et al. | 725/107 |
| 2002/0100063 A1 | 7/2002 | Herigstad et al. | 725/141 |
| 2002/0116235 A1 | 8/2002 | Grimm et al. | 705/5 |
| 2002/0144268 A1 | 10/2002 | Khoo et al. | 725/47 |
| 2002/0154692 A1 | 10/2002 | Martin | 375/240.01 |
| 2002/0158895 A1 | 10/2002 | Murase et al. | |
| 2002/0162108 A1 | 10/2002 | Lin-Hendel | 725/52 |
| 2002/0166122 A1 | 11/2002 | Kikinis et al. | |
| 2002/0169687 A1 | 11/2002 | Perkowski | 705/26 |
| 2002/0184627 A1 | 12/2002 | Alba et al. | 725/39 |
| 2002/0186621 A1 | 12/2002 | Lai | 368/82 |
| 2002/0188960 A1 | 12/2002 | Rodriguez et al. | 725/120 |
| 2003/0014757 A1 | 1/2003 | Kim | 725/87 |
| 2003/0052905 A1 | 3/2003 | Gordon et al. | 345/700 |
| 2003/0084449 A1 * | 5/2003 | Chane et al. | 725/46 |
| 2003/0169282 A1 | 9/2003 | Herigstad et al. | 345/700 |
| 2004/0060061 A1 * | 3/2004 | Parker | 725/38 |
| 2004/0199932 A1 * | 10/2004 | Gottfurcht et al. | 725/52 |
| 2004/0268413 A1 * | 12/2004 | Reid et al. | 725/131 |
| 2005/0060745 A1 * | 3/2005 | Riedl et al. | 725/42 |
| 2006/0059525 A1 | 3/2006 | Jerding et al. | 725/87 |
| 2006/0206912 A1 | 9/2006 | Klarfeld et al. | 725/40 |
| 2007/0011702 A1 * | 1/2007 | Vaysman | 725/45 |
| 2007/0186228 A1 * | 8/2007 | Ramaswamy et al. | 725/14 |

OTHER PUBLICATIONS

Marston, Toni, "Generating dynamic web pages using XSL and XML," Feb. 1, 2003, http://web.archive.org/web/20030716124825/http://www.tonymarston.net/xml-xsl-and..., pp. 1-30.

Translation of Office Action mailed Apr. 5, 2011, for Japanese Patent Application No. 2007-539191, 3 pgs.

Patent Examiner for the Japanese Patent Office, Office Action issued Aug. 5, 2011 for Japanese patent application No. 2007-539191 (4 pages total—including 2 pages which are a translated version of the Office Action).

European Office Action, Oct. 16, 2012, Application No. 04753688.3, p. 1-5.

U.S. Appl. No. 10/856,200, filed May 28, 2004, 35 pages.

* cited by examiner

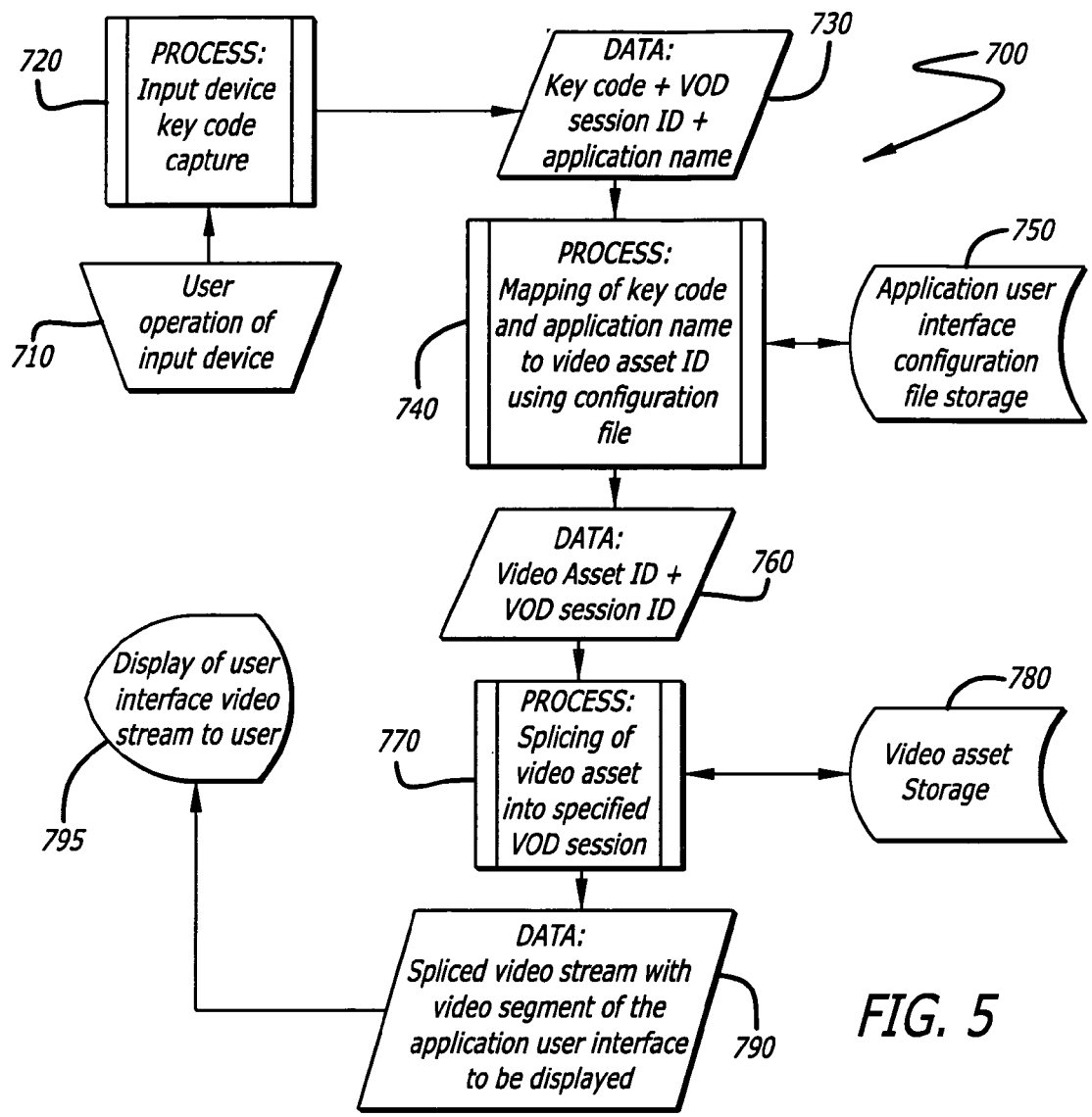

FIG. 5

```
<?xml version="1.0"?>
<ApplicationName>
        <VideoSegment AssetID="A153254">
                <input KeyCode="1" AssetID="A153255" />
                <input KeyCode="2" AssetID="A153256" />
                <input KeyCode="3" AssetID="A153257" />
                <input KeyCode="4" AssetID="A153258" />
                <input KeyCode="5" AssetID="A153259" />
                <input KeyCode="6" AssetID="A153260" />
                <input KeyCode="7" AssetID="A153261" />
                <input KeyCode="8" AssetID="A153262" />
                <input KeyCode="9" AssetID="A153263" />
        </VideoSegment>
</ApplicationName>
```

FIG. 6

SYSTEM FOR ENABLING VIDEO-BASED INTERACTIVE APPLICATIONS

CROSS-REFERENCES TO RELATED APPLICATION

This application claims the benefit of U.S. Provisional Application Ser. No. 60/623,369, filed Oct. 29, 2004, the content of which is hereby incorporated herein by reference.

BACKGROUND OF THE INVENTION

This invention is in the field of systems and methods for delivering interactive applications to resource constrained devices that are capable of displaying video such as digital television set-top boxes, mobile phones or other video capable devices. This invention enables new ways to deliver the user interface for interactive application.

A very large number of today's digital video set-top boxes are limited by their inability to display graphically rich and dynamic user interfaces for interactive applications, such as interactive program guides. This limitation is due to the poor graphics display capabilities that most set-top boxes exhibit, as well as the broadcast carousel-based delivery mechanism for graphics utilized in application user interfaces (UI).

The typical on-screen display (OSD) for a low-end set-top box supports only low resolution graphics with very limited number of displayable colors.

In addition, the performance of set-top box-based graphically rich applications which leverage broadcast data carousels, for example, a Digital Storage Media Command and Control (DSMCC) carousel, for graphics delivery is inversely proportional to the amount of graphics material utilized by the user interface of an application. In other words, the more user interface graphics that are utilized by the application, the slower the access time is for those graphics due to the cyclical nature of the broadcast carousel delivery mechanism for the graphics which causes the application to wait for the needed graphic until it is repeated again in the carousel. Consequently, this causes a noticeably slow response time for the application when a remote control key is pressed that leads to an graphical update of the application's user interface.

These set-top limitations combined with recent feature additions to video-on-demand servers present an opportunity to significantly enhance the user interfaces of program guide applications and other types of interactive applications.

In recent years, video service providers (for example, cable companies) have made a great investment in the build-out of video-on-demand (VOD) infrastructure. Whether it be network-based VOD servers or set-top box based digital video recorders (DVRs), the infrastructure is in place to deliver what people want to see, when they want to see it. These VOD servers are also capable of splicing together various streams of video to provide a seamless viewing experience—a feature primarily driven by the business of ad-insertion, but also useful in the invention which is about to be described.

Accordingly, what is needed and heretofore unavailable is a system and method for displaying graphically rich and dynamic user interfaces for interactive program guides and interactive applications on resource constrained video display devices such as digital video set-top boxes or mobile phones.

SUMMARY OF THE INVENTION

The multimedia content presentation system of the present invention enables delivery and display of video-based interactive applications to resource-constrained devices that are capable of displaying video, such as digital television set-top boxes, mobile phones, personal computers (PC), personal digital assistants (PDA) or other video capable devices. The advent of substantial video-on-demand (VOD) infrastructure and associated splicing capabilities brings about a new system and method for displaying graphically rich and dynamic user interfaces for interactive program guides and interactive applications in general.

The systems and associated methods of the present invention are embodied in three different instantiations to deliver and display graphically rich and dynamic user interfaces for interactive program guides and other interactive applications on resource-constrained video display devices such as digital video set-top boxes or mobile phones. The first instantiation of the present invention is directed to enabling the delivery of a graphically rich and dynamic interactive application user interface to a low-end digital set-top box utilizing the video splicing capability of a VOD server located in a cable television network. The second instantiation of the present invention is directed to enabling the delivery of a graphically rich and dynamic interactive application user interface to a slightly more sophisticated digital video set-top box utilizing the video splicing capability of a VOD server located in a cable television system with more processing capability than the set-top box in the first instantiation. The third instantiation of the present invention is directed to enabling the delivery of a graphically rich and dynamic interactive application user interface to a much more sophisticated digital video set-top box with digital video storage and playout capability in a cable television system. The third instantiation would also be functional in a one-way broadcast environment (for example, a terrestrial or satellite television network) wherein DVR set-top boxes are deployed.

The present invention includes systems and methods for delivering video-rich interactive application user interfaces. The system allows for encoding a plurality of different user interface screens of interactive applications into a series of short video segments. Associated metadata files uniquely describe each segment, wherein the segment metadata enables the ingestion of the video segments via an asset distribution and management system into a video-on-demand server and facilitates their subsequent identification by the video-on-demand server. As viewers interact with the application, their input device key presses are processed and delivered to a mapping server which utilizes the data in a configuration file to instruct the VOD server to splice the appropriate interactive application user interface digital video segment into the video stream being displayed on the display device.

The present invention also provides a video-on-demand server having seamless video splicing capability that is executed upon receiving data from a mapping server. The mapping server specifies which interactive application user interface digital video asset must be spliced into the video stream being served as part of a specific VOD session to a user. The mapping server receives data from the input processing component specifying the last input device (for example, remote control) key pressed by the viewer and which VOD session identification (ID) that viewer is assigned. Using the data in the configuration file, the mapping server then maps that key code and VOD session ID to the appropriate interactive application user interface digital video segment asset ID that must be spliced into the video signal being distributed via a specific VOD session to a viewer. The result is that when the viewer presses an input device button representing a selection presented by the current interactive application user interface digital video segment being displayed on the display device, the next appropriate interactive application user interface digital video segment is then displayed in the display component.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 5 is a block diagram if the video-on-demand server mapping process of the present invention.

FIG. 6 is an example configuration file format for the video-on-demand mapping process of the present invention.

DETAILED DESCRIPTION OF THE INVENTION

Figure 1:
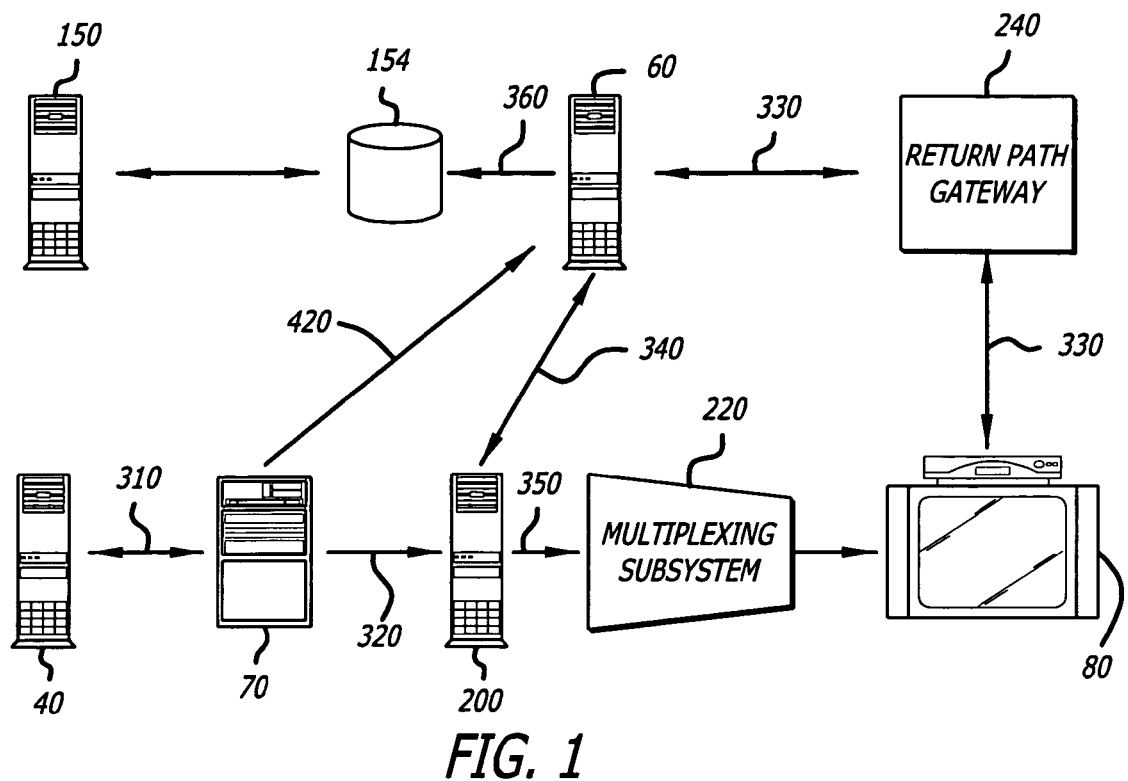
FIG. 1 is a schematic drawing representing a network-based VOD server with simple client application.

As shown in the drawings for purposes of illustration, the present invention is directed to a new system and method for displaying graphically rich and dynamic user interfaces for interactive program guides and interactive applications in general. The systems and associated methods of the present invention are embodied in three different instantiations to deliver and display graphically rich and dynamic user interfaces for interactive program guides and other interactive applications on resource-constrained video display devices such as digital video set-top boxes or mobile phones. Although the invention can be utilized to enable graphically rich and dynamic user interfaces for a multitude of interactive applications, the examples that follow will describe how the invention will enable the delivery and display of the user interface as described in the previously filed patent application for "SYSTEM FOR PRESENTATION OF MULTIMEDIA CONTENT," U.S. Ser. No. 10/856,200 filed May 28, 2004, the content of which is hereby incorporated herein by reference.

Referring now to FIGS. 1-4, the system of the present invention includes several components or subsystems for (a) user interface configuration and conversion to individually encoded digital video segments (preparation component); (b) a mapping server to map user input device key presses to the appropriate interactive application user interface digital video segment (deployment component); (c) asset distribution and management to deliver the individually encoded video segments constituting the user interface of the interactive application to various VOD servers in a video network (asset distribution component); (d) video display device, such as a digital set-top box (display component); and (e) interactive application input device key press reporting (input processing component); and (f) interactive application usage reporting (metrics component). In addition, the present invention includes a subsystem having a VOD server with seamless video-splicing capability. Additional aspects of the system include a return path gateway for delivering input device key press data to the deployment component, and a video multiplexing subsystem to interface between the VOD server and the video display device.

The preparation component 40 is a tool that enables the interactive application's various user states to be recorded as individual digital video segments and assigns a unique asset identifier (ID) to each individual digital video segment. In addition, the preparation component generates the configuration file(s) used by the mapping server (deployment component) to map the various input device key presses to the appropriate interactive application user interface digital video segment to be displayed in the display component.

The deployment component 60 is a mapping server which utilizes the configuration file(s) generated by the preparation component for a particular interactive application to map user input device key presses to the appropriate interactive application user interface digital video segment to be played out by the VOD server component and subsequently displayed on the display device.

The asset insertion component 70 is a system for managing video content and provisioning VOD servers in entertainment networks with such content. The video content can consist of movies, television programs, or in the case of this invention, the pre-encoded digital video segment that make up an interactive application user interface.

The metrics component 150 is an interactive application usage measurement tool and data storage device 154 that allows entertainment companies and advertisers to aggregate and analyze interactive application usage by their audience. This information includes: what interactive application navigation pathways are utilized most often and what interactive application user interface components are utilized most often. The information provided by the metrics component allows interactive service providers to hone the effectiveness of their interactive applications. It is an optional component and not a core part of the invention for delivering and displaying a graphically rich and dynamic interactive application user interfaces on video-enabled resource-constrained devices.

Referring to FIG. 5, the VOD server 200 supports a seamless video splicing capability that is executed upon receiving data from the mapping server component specifying which interactive application user interface digital video asset must be spliced into the video stream being served as part of a specific VOD session to a user. The mapping server receives data from the input processing component 720 specifying the last input device (for example, remote control) key pressed by the viewer, the interactive application name being utilized by the viewer and which VOD session ID that viewer is assigned. Using the data in the configuration file, the mapping server 740 then maps the interactive application name, the key code and VOD session ID to the appropriate interactive application user interface digital video segment asset ID that must be spliced 770 into the video signal being distributed via a specific VOD session to a viewer 795. The result is that when the viewer presses an input device button representing a selection presented by the current interactive application user interface digital video segment being displayed on the display device, the next appropriate interactive application user interface digital video segment is then displayed in the display component.

Figure 2:
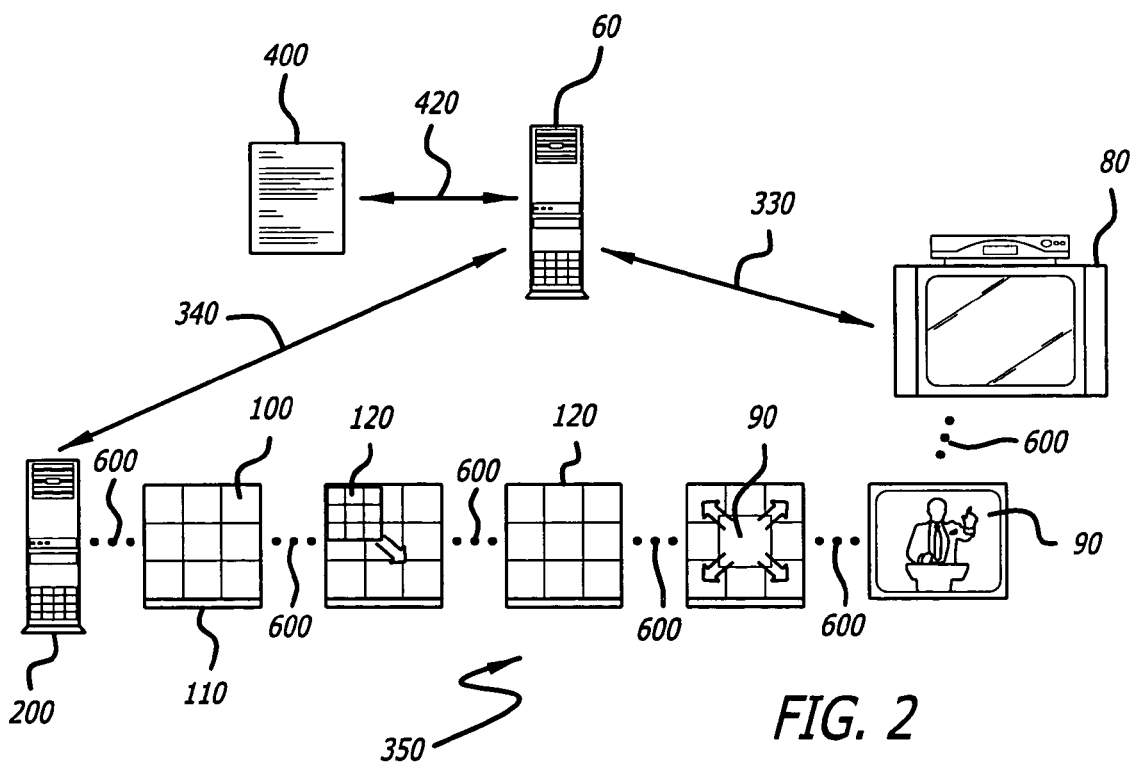
FIG. 2 is a schematic drawing representing a mapping server process.

In one aspect of the system of the present invention, and with particular reference to FIGS. 1 and 2, the invention includes the following six steps. In the first step 310, the different user interface screens of the interactive program guide are encoded by the preparation component 40 into a series of short video segments with associated metadata files that uniquely describe each segment. The segment metadata enables the ingestion of the video segments via an asset distribution and management system 70 into a VOD server 200, and facilitates their subsequent identification by the VOD server. In the case of the System for Presentation of Multimedia Content patent application, these video segments may include:

A. visual presentation of a defined number (X) of N×M matrices of cells (display tiles) 100, where X, N and M may be a number from one to the capacity of the interactive application user interface. Each video segment could consist of a fade-in to display a N×M matrix of cells and then a fade-out.

B. N×M number of forward transitions 120. Each segment could consist of a fade-in to the appropriate transition and then a fade-out.

C. N×M number of backward transitions. Each segment could consist of a fade-in to the appropriate transition and then a fade-out.

D. N×M number of expansions from one cell 100 in the N×M matrix of cells 110 to full-screen content 90. Each segment could consist of a fade-in to the appropriate transition and then a fade-out, after which the VOD server will play the selected content.

E. N×M number of contractions to a N×M matrix of cells 110 from full screen content 90. Each segment could consist of a fade-in to the appropriate transition and then a fade-out, after which the appropriate N×M matrix of cells would be displayed.

F. A defined number (X) of interstitial advertising segments. Each segment could consist of a fade-in to brief advertiser brand impression and then a fade-out.

It is important to note that in addition to the application of this invention to the above referenced interactive program guide and its unique user interface, this same methodology can also be applied to other types of interactive application user interfaces.

Once the initial step 310 of the system and method of the present invention is complete, the second step 320 is to provision the VOD server 200 (FIG. 2) storage or DVR storage unit 84 (FIG. 4) with these video segments and their uniquely identifying metadata. The asset distribution component is utilized for this task and can manifest itself in a variety of mechanisms including, but not limited to:

A. pitcher-catcher video provisioning networks,
B. dedicated broadcast channel for DVR content delivery, or
C. the Internet.

In addition to provisioning the VOD segments and their metadata, a configuration file 400 (FIG. 2), which provides a map of how the video segments of an interactive application user interface are to be spliced together based upon input device key selections, must be sent 420 to a mapping server 60 or to the DVR-based client software which can incorporate a mapping server function. This configuration file allows the mapping server to relate the interactive application user states with the identifiers of the user interface video segments that make up the interactive application. As the video segments representing the user interface of an interactive application are played out from the VOD server, the mapping server processes input device key press, interactive application name and VOD session identification (ID) data sent via the set-top box 80 return path 240 and instructs the VOD server 200 to splice the user interface video segments 90 associated with the remote control key-presses and the currently displayed video segment comprising the user interface of the interactive application existing within a specific VOD session.

The subsequent interactive application utilization session involves the repeated execution of steps three, four and five. The third step 330 includes reporting to the mapping server 60 by the set-top application 80 of the remote control key-presses made by the viewer and an associated VOD session identification. The fourth step 340 provides instruction by the mapping server to the VOD server 200 which video segment to splice-in and playout to the set-top box within the identified VOD session. The fifth step 350 includes splicing and delivery of the appropriate interactive application user interface video segment by the VOD server to the set-top box within the appropriate VOD session. As shown in FIG. 2, there are several user interface video segment splicing operations illustrated 600 so as to deliver a seamless user interface for the interactive application as a single video stream displayed by the display device. For analysis purposes, the system may optionally be configured to provide reporting 360 to the metrics component 150 of the interactive application navigation pathways utilized by viewers.

Figure 3:
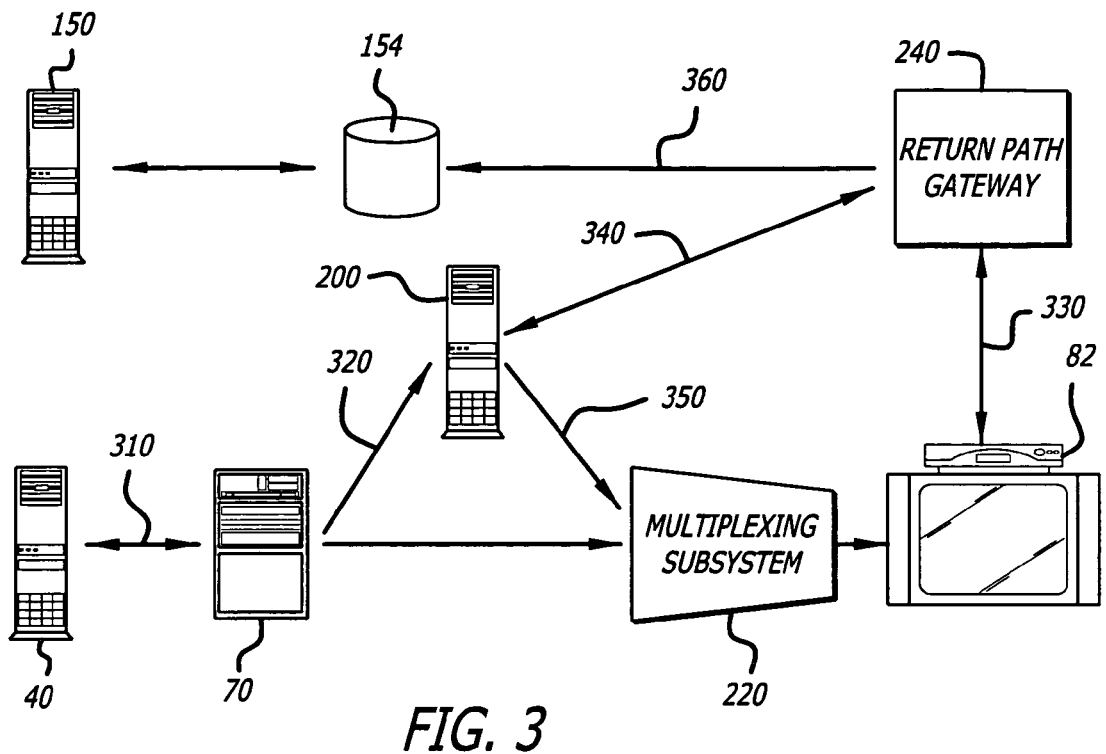
FIG. 3 is a schematic drawing representing network-based VOD server with intelligent client application.

Referring now to FIG. 3, the second instantiation of the present invention includes the same architecture but moves the logic of the mapping server to exist as an application in the digital video set-top box. In this case, the overall configuration file could be delivered via a multiplexed broadcast data carousel to the set-top box application. Utilizing the remote control key press data from the interactive application user and the data in the configuration file, the set-top box client application would then communicate via the return path with the VOD server to instruct it to splice-in and playout the appropriate interactive application user interface video segments for that VOD session. Additionally in this second variation of the system of the present invention, the configuration file could be delivered with the video segments in piecemeal fashion such that only the portion of the configuration file associated with that video segment is delivered at any one moment. This allows for more efficient set-top memory utilization.

Figure 4:
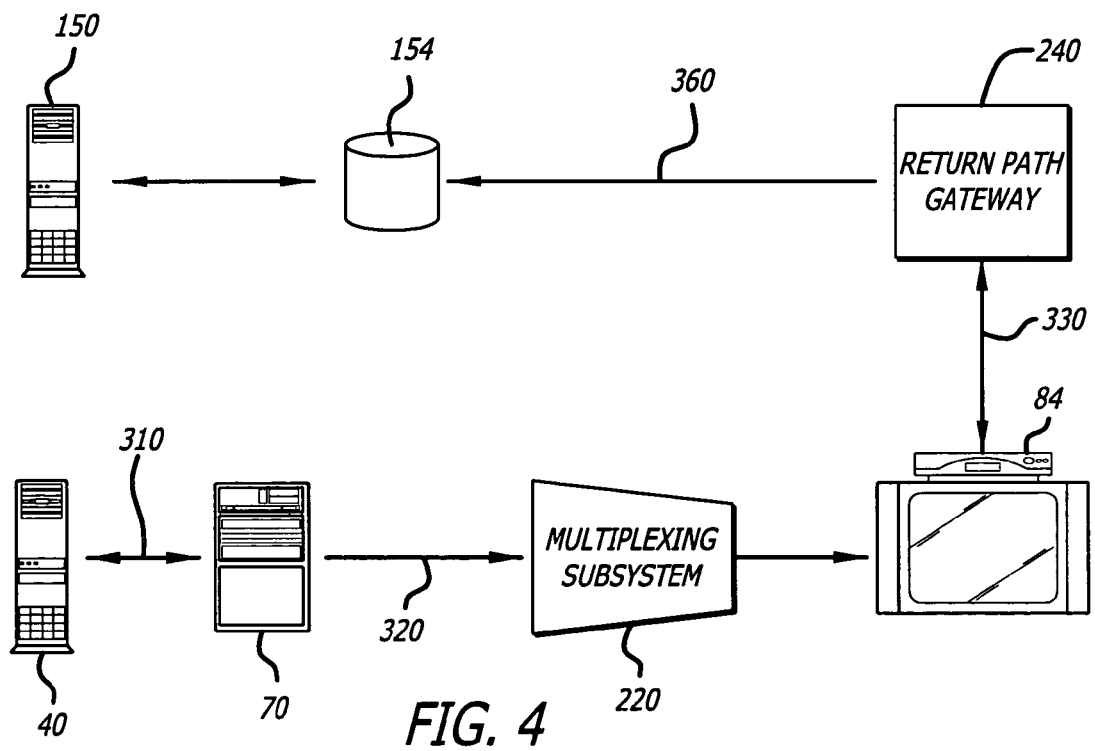
FIG. 4 is a schematic drawing representing a set-top box-based VOD server with intelligent client application.

Referring now to FIG. 4, the third instantiation of the present invention entails moving both the logic of the mapping server and VOD server functionality into the set-top box application. This variation would be useful in a one-way broadcast environment, for example, a terrestrial or satellite television network in which DVR set-top boxes are deployed. Set-top-based VOD servers known as digital video recorders (DVR) are quickly being deployed by cable and satellite operators in the battle for subscriber dollars. In this case, the interactive application user interface video segments would be delivered directly to the DVR storage and played out from there as the client application decides what video segment to splice-in when the viewer presses a remote control key.

FIG. 6 shows a sample configuration file that may be used in the VOD mapping process. It is expressed in the syntax of XML, although the file could be expressed in many other syntactical formats as well. The "ApplicationName" element in the configuration file specifies the application currently being utilized by the viewer (for example, interactive program guide). The VideoSegment "AssetID" attribute specifies the application user interface video segment currently being displayed on the display device. The input "KeyCode" attribute specifies a input key code that if pressed on the input device would cause the splicing in and playout of the application user interface video segment associated with the associated "AssetID" attribute. For example, if a user was viewing the user interface video segment identified by AssetID="A153254" and they pressed the "1" key on their input device (for example, a television remote control), then the application user interface video segment associated with AssetID="A153255" would be displayed on the display device.

While a particular form of the invention has been illustrated and described, it will also be apparent to those skilled in the art that various modifications can be made without departing from the spirit and scope of the invention. Accordingly, it is not intended that the invention be limited except by the appended claims.

I claim:

1. A method of delivering graphically rich interactive application user interfaces to video-enabled resource-constrained devices, comprising:
   a) encoding a plurality of user interface screens into a series of video segments having associated editable configuration files each configuration file comprising a user interface application identifier, wherein encoding a plurality of user interface screens includes providing video segments having N×M number of cells, wherein at least one of N and M is greater than one, and each cell having an asset ID and a keycode associated with the cell in the configuration file, wherein each cell contains another N×M matrix of cells expandable from the cell of the N×M matrix of cells, thereby generating a hierarchical matrix of cells; b) provisioning a video-on-demand server with the video segments; c) reporting to a deployment component video-on-demand (VOD) session identification data, application identifier and user input commands;
   d) utilizing the configuration files to map the VOD session identification data, the interactive application identifier and user input commands to the specific video asset ID representing a user interface component of an interactive application;
   e) instructing the VOD server to splice that video segment into the identified VOD session;
   f) splicing a video segment within the identified VOD session;
   g) displaying the resultant video-based interactive application user interface for a viewer; and
   h) reporting to a metrics component interactive program navigation pathways utilized by the viewer, wherein the interactive program navigation pathways are anonymously reported.

2. The method of claim 1, wherein the video segments have N×M number of expansions from one cell in the N×M matrix of cells to full-screen content.

3. The method of claim 1, wherein encoding a plurality of user interface screens enables the ingestion of the video segments via an asset distribution and management system into the video-on-demand server, and facilitates subsequent identification of the video segments by the video-on-demand server.

4. The method of claim 1, wherein provisioning a video-on-demand server includes using a pitcher-catcher video provisioning network.

5. The method of claim 1, wherein provisioning a video-on-demand server includes using a dedicated broadcast channel for content delivery.

6. The method of claim 1, wherein provisioning a video-on-demand server includes using an IP-based network such as the Internet.

7. The method of claim 1, further including sending to a mapping server a configuration file having a map of how the video segments comprising the interactive application user interface are to be spliced together based upon user input commands and the VOD session identification data as well as the interactive application identifier.

8. The method of claim 1, wherein delivering the spliced-together video segments comprising the user interface of the interactive application from the video-on-demand server to a television set-top box enables seamless presentation of a graphically rich and dynamic interactive application user interface.

9. The method of claim 1, wherein the generating includes:
   a) creating an empty N×M matrix definition file using a unique identifier;
   b) accessing an at least one source of multimedia content assets;
   c) forming a dynamic content provisioning template; and
   d) repeating the creating until all N×M definition files are created, the N×M definition files represent the hierarchical matrix of cells.

10. A system for presentation of multimedia content, comprising:
    a) a preparation component, which generates a user interface by converting individual digital encoded video segments using editable configuration files, each configuration file comprising a user interface application identifier, that describe an N×M matrix of display cells, wherein at least one of N and M is greater than one, each cell having an asset ID and a keycode associated with the cell, and further wherein each cell in the N×M matrix of display cells comprises one of another N×M matrix of display cells, thereby generating a hierarchical matrix of cells, and a content asset configured for display by a display component;
    b) a deployment component, which is a mapping server that utilizes the configuration files to map user input device key presses and associated interactive application and VOD session identification data to the appropriate interactive application user interface digital video segment to be displayed in the display component;
    c) an asset distribution component, which delivers the individually encoded video segments comprising the user interface of an interactive application to various video-on-demand (VOD) servers in a video network;
    d) a display component, which displays the result of the splicing together of the video segments comprising the user interface of an interactive application, wherein the display is capable of concurrently displaying a plurality of videos;
    e) an input processing component, which captures and sends the user key press and VOD session identification data to the deployment component;
    f) a metrics component, which collects and analyzes interactive application user interface utilization statistics including interactive program navigation pathways that are utilized by a viewer and reported to the metrics component, wherein the interactive program navigation pathways are anonymously reported;
    g) a VOD server component, which seamlessly splices together the digital video segments comprising the user interface of an interactive application and stream them to the display component;
    h) a return path gateway component, which captures data from the input processing component and transfers it to the deployment component; and
    i) a video multiplexing subsystem component, which enables the multiplexing of a plurality of the video streams presenting the interactive application's user interface into a larger video transport stream for eventual reception and display by the display component.

11. The system of claim 10, wherein the functionality of the input processing component and the display component are combined in a single device such as a digital video set-top box or mobile phone and all other components exist and function independently of one another.

12. The system of claim 11, wherein the functionalities of the input processing component and the deployment component are combined with the display component in a single device such as a digital video set-top box or a mobile phone.

13. The system of claim 11, wherein the functionalities of the input processing component, the deployment component and the VOD server component are combined with the display component in a single device such as a digital video set-top box or mobile phone with video storage and playout capabilities, for example, a digital video recorder (DVR).

14. The system of claim 11, wherein all components exist in a video network capable of bi-directional network communication.

15. The system of claim 11, wherein all components exist in a video network capable of only uni-directional network communication.

16. A method of delivering graphically rich interactive application user interfaces to video-enabled resource-constrained devices, comprising:
   a) encoding a plurality of user interface screens into a series of video segments having associated configuration files each comprising an application identifier, wherein encoding a plurality of user interface screens includes providing video segments having N×M number, wherein at least one of N and M is greater than one, of expansions from one cell in the N×M matrix of cells to full-screen content, wherein each cell includes an asset ID and a keycode associated with the cell in the configuration file, thereby generating a hierarchical matrix of cells; b) provisioning a video-on-demand server with the video segments; c) reporting to a deployment component video-on-demand (VOD) session identification data, application identifier and user input commands;
   d) utilizing the configuration files to map the VOD session identification data, the interactive application identifier and user input commands to the specific video asset ID representing a user interface component of an interactive application; e) instructing the VOD server to splice that video segment into the identified VOD session;
   f) splicing a video segment within the identified VOD session;
   g) displaying the resultant video-based interactive application user interface for a viewer, wherein the resultant video-based interactive application user interface is configured to contain N×M matrix of cells and is configured to and capable of concurrently displaying at least two different videos in at least two of the N×M cells, wherein one of the at least two different videos is capable of been selected to be expanded into a full screen;
   h) reporting to a metrics component interactive program navigation pathways utilized by the viewer, wherein the interactive program navigation pathways are anonymously reported.

17. The method of claim 16, wherein one cell of the N×M matrix of cells is configured to contain a second N×M matrix cell expandable from the cell of the N×M matrix of cells.

18. The method of claim 16 further comprises contracting the one of the at least two videos expanded into the full screen back to one of the cells of the N×M matrix of the cells.

* * * * *